US011199488B2

(12) United States Patent
Blandin et al.

(10) Patent No.: US 11,199,488 B2
(45) Date of Patent: Dec. 14, 2021

(54) METHOD FOR COUNTING PARTICLES IN A SAMPLE BY MEANS OF LENSLESS IMAGING

(71) Applicants: COMMISSARIAT A L'ENERGIE ATOMIQUE ET AUX ENERGIES ALTERNATIVES, Paris (FR); HORIBA ABX SAS, Montpellier (FR)

(72) Inventors: Pierre Blandin, Coublevie (FR); Anais Ali-Cherif, Clermont Ferrand (FR); Estelle Gremion, La Tour du Pin (FR); Sebastien Raimbault, Argelliers (FR); Olivier Cioni, Grenoble (FR); Aurelien Daynes, Montpellier (FR)

(73) Assignees: COMMISSARIAT A L'ENERGIE ATOMIQUE ET AUX ENERGIES ALTERNATIVES, Paris (FR); HORIBA ABX SAS, Montpellier (FR)

( * ) Notice: Subject to any disclaimer, the term of this patent is extended or adjusted under 35 U.S.C. 154(b) by 333 days.

(21) Appl. No.: 16/471,429

(22) PCT Filed: Dec. 20, 2017

(86) PCT No.: PCT/FR2017/053725
§ 371 (c)(1),
(2) Date: Jun. 19, 2019

(87) PCT Pub. No.: WO2018/115734
PCT Pub. Date: Jun. 28, 2018

(65) Prior Publication Data
US 2021/0131944 A1    May 6, 2021

(30) Foreign Application Priority Data
Dec. 21, 2016   (FR) ........................... 1663028

(51) Int. Cl.
*G06K 9/00* (2006.01)
*G01N 15/14* (2006.01)
*G01N 15/00* (2006.01)

(52) U.S. Cl.
CPC ..... *G01N 15/1475* (2013.01); *G01N 15/1463* (2013.01); *G01N 2015/008* (2013.01);
(Continued)

(58) Field of Classification Search
CPC ........... G01N 15/1475; G06K 9/00127; G06K 9/00134; G06K 9/0014; G06K 9/00147; G06T 7/521; G06T 2207/30024
See application file for complete search history.

(56) References Cited

U.S. PATENT DOCUMENTS

| 2003/0112432 | A1* | 6/2003 | Yguerabide | ........... G01N 21/47 356/317 |
| 2003/0139886 | A1* | 7/2003 | Bodzin | .................. G01N 21/47 702/28 |
| 2006/0120428 | A1* | 6/2006 | Oh | ........................ B82Y 10/00 372/96 |
| 2006/0210428 | A1 | 9/2006 | Lindberg et al. | |

(Continued)

FOREIGN PATENT DOCUMENTS

| WO | WO 2015/195642 A1 | 12/2015 | |
| WO | WO 2016/151249 A1 | 9/2016 | |
| WO | WO-2016151249 A1 * | 9/2016 | ............ C12M 41/46 |

OTHER PUBLICATIONS

International Search Report dated Mar. 22, 2018 in PCT/FR2017/053725 filed on Dec. 20, 2017.

*Primary Examiner* — Avinash Yentrapati
(74) *Attorney, Agent, or Firm* — Oblon, McClelland, Maier & Neustadt, L.L.P.

(57) ABSTRACT

The invention relates to a method for counting particles, particularly blood cells, in a sample, using a lensless optical imaging device. The sample is arranged between a light source and an image sensor. The sample is illuminated by a light source and an image is acquired by the image sensor, (Continued)

said image sensor being exposed to a light wave called an exposition wave. A digital propagation operator is applied to the acquired image so as to obtain a complex amplitude of the exposition wave according to a surface facing the image sensor. An image, called a reconstructed image, is formed from the modulus and/or the phase of said complex amplitude, on which image the particles to be counted appear in the form of regions of interest. The method then comprises a step of selecting the regions of interest corresponding to the particles to be counted.

20 Claims, 7 Drawing Sheets

(52) U.S. Cl.
CPC ............... *G01N 2015/0073* (2013.01); *G01N 2015/1486* (2013.01)

(56) References Cited

U.S. PATENT DOCUMENTS

| | | |
|---|---|---|
| 2008/0137060 A1* | 6/2008 | Skultety-Betz ......... G01S 17/08 356/4.01 |
| 2008/0137080 A1 | 6/2008 | Bodzin et al. |
| 2008/0160566 A1* | 7/2008 | Lindberg ......... A61B 5/150099 435/40.51 |
| 2009/0190129 A1* | 7/2009 | Yguerabide ..... G01N 33/54346 356/338 |
| 2012/0148141 A1* | 6/2012 | Ozcan ................. G03H 1/0866 382/133 |
| 2012/0218379 A1* | 8/2012 | Ozcan ................. G03H 1/0866 348/40 |
| 2013/0308135 A1* | 11/2013 | Dubois ................. G01B 9/021 356/457 |
| 2017/0132450 A1* | 5/2017 | El-Zehiry .......... G06K 9/00127 |
| 2018/0080760 A1* | 3/2018 | Allier ................. G01N 15/1429 |
| 2018/0113064 A1* | 4/2018 | Allier ................... G06T 7/0012 |

\* cited by examiner

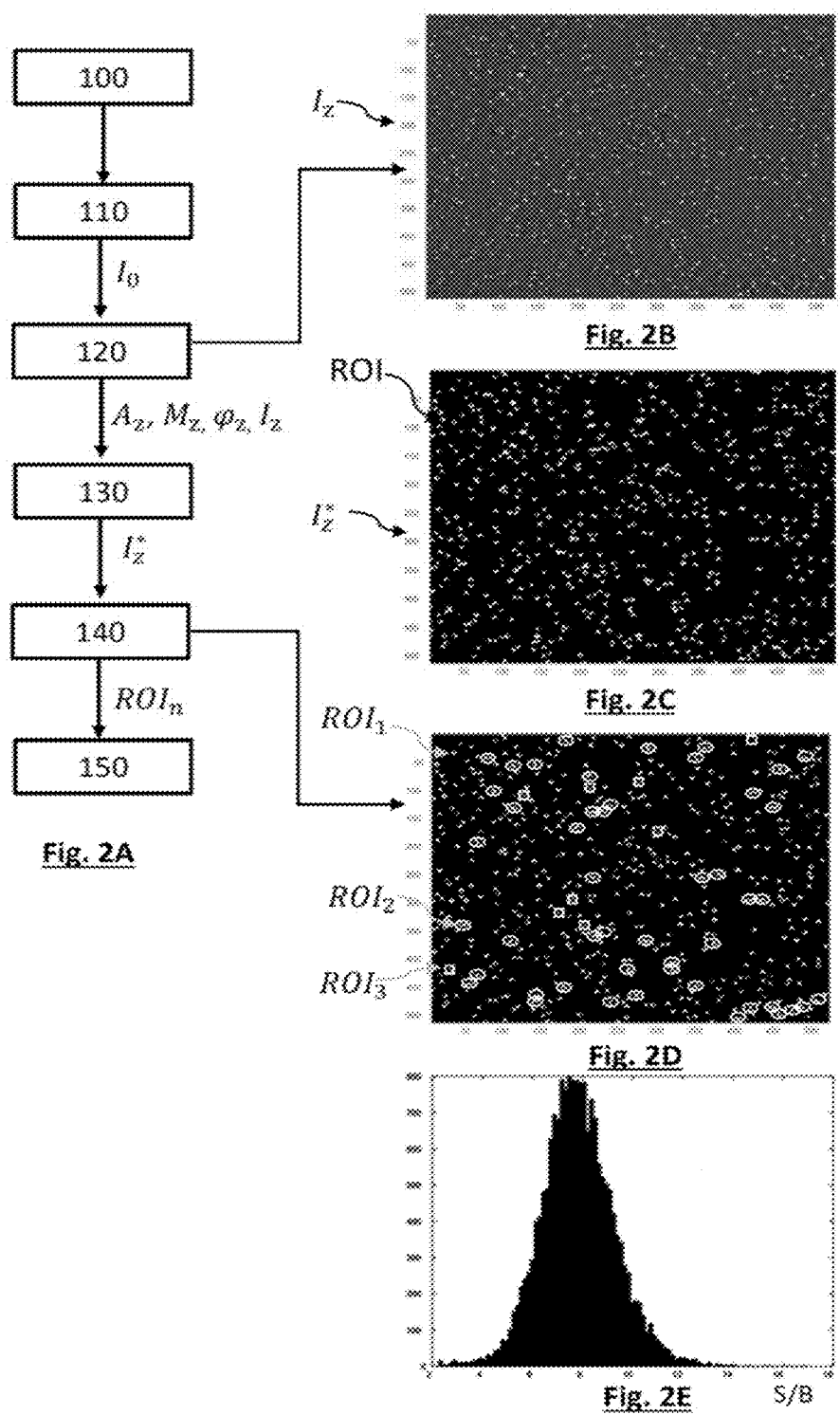

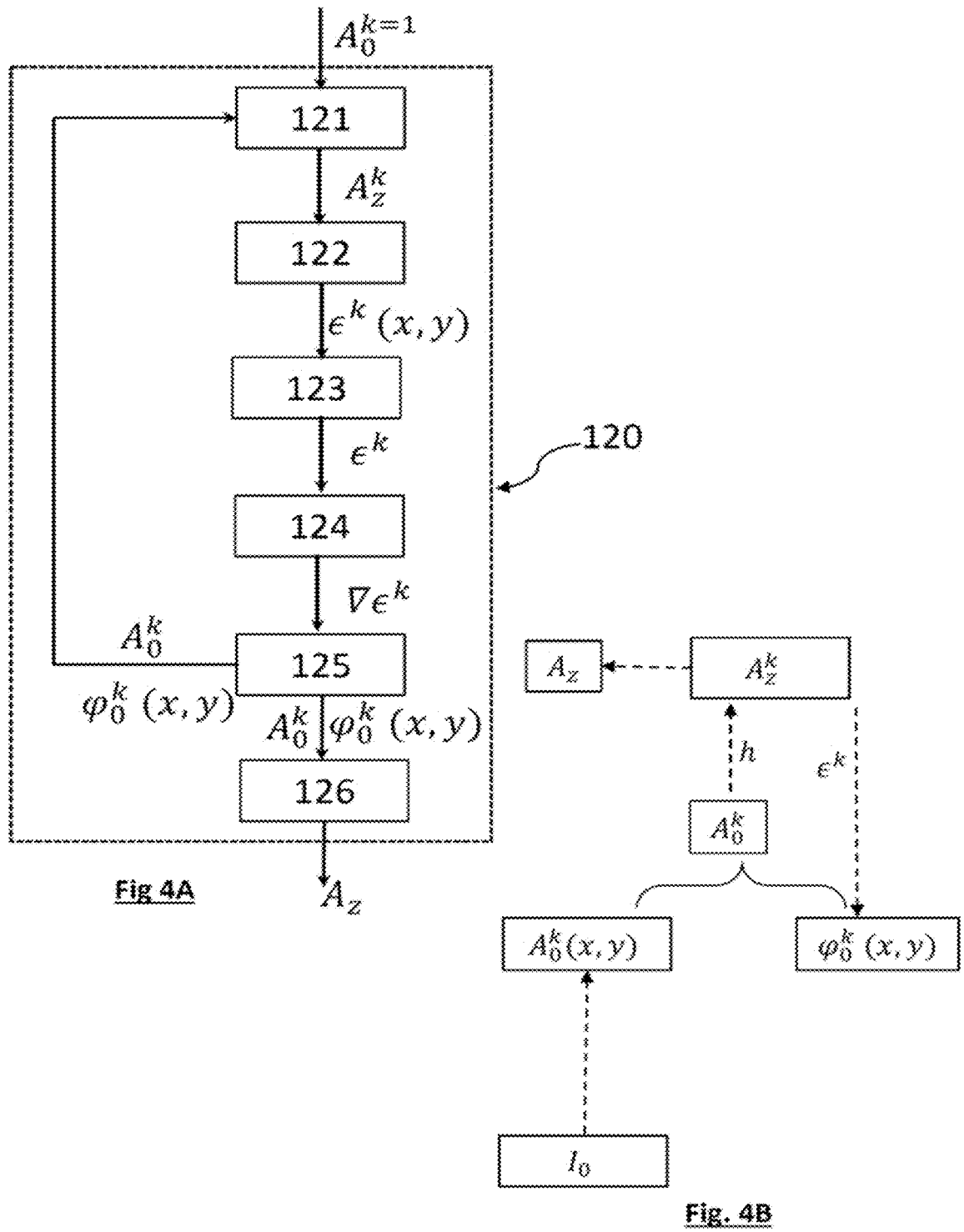

METHOD FOR COUNTING PARTICLES IN A SAMPLE BY MEANS OF LENSLESS IMAGING

TECHNICAL FIELD

The invention is an optical method for the counting of particles, in particular blood cells, arranged in a sample, with the aid of a lensless imaging device.

PRIOR ART

In the field of hematology, the counting of blood cells, such as red blood cells or white blood cells, is a routine procedure. The analytical laboratories are equipped with automatic machines which can produce reliable hemograms. The principles implemented by these machines are cytometry measurements based on a variation in impedance or a diffusion of a light beam. However, the machines are generally costly and their use remains confined to the laboratory.

Outside of hematology, the identification of particles of interest in a sample and their counting are commonly performed operations.

Document WO2008090330 describes a device enabling the observation of samples containing cells by lensless imaging. The sample is arranged between a light source and an image sensor, without placing an optical magnifying lens between the sample and the image sensor. Thus, the image sensor collects an image of a light wave transmitted by the sample. This image, also called a hologram, is formed from interference patterns between the light wave emitted by the light source and transmitted by the sample, and diffraction waves resulting from the diffraction by the sample of the light wave emitted by the light source. These interference patterns are generally formed by a succession of concentric rings. These are sometimes called diffraction patterns. One thus acquires images whose field of observation is clearly larger than that of a microscope. When the concentration of cells in the sample is sufficiently small, each cell may be associated with an interference pattern; counting of these enables the cells present in the sample to be counted. But the hologram does not enable a reliable counting of the cells when the concentration is increased.

The hologram acquired by the image sensor may be processed by a holographic reconstruction algorithm in order to estimate optical properties of the sample, such as an absorption or a phase shift value of the light wave passing through the sample and propagating toward the image sensor. This type of algorithm is well known in the field of holographic reconstruction. One example of a holographic reconstruction algorithm is described in the publication of Ryle et al, "Digital in-line holography of biological specimens", Proc. Of SPIE Vol. 6311 (2006). However, such algorithms may give rise to the appearance of a reconstruction noise, known as a "twin image", in the reconstructed image. Thus, their application requires certain precautions. Application US2012/0218379 describes a method enabling the reconstructing of a complex image of a sample, said image comprising information about the amplitude and the phase. Application US2012/0148141 applies the method described in application US2012/0218379 to reconstruct a complex image of spermatozoids and to characterize their mobility. Lensless imaging was applied in WO2016/151249 to analyze a sample containing cells.

An alternative method for observation of samples is holographic microscopy, for example as described in US2013/0308135, or, applied to blood particles, in WO2015/195642, the latter describing in particular an estimating of the volume of red blood cells or white blood cells. The methods of holographic microscopy are relatively complicated in their implementation. Document US2008/0160566 proposes a simple alternative, also intended for a determination of the volume of white blood cells, by forming an image with the aid of a standard optical device, the white blood cells having been previously labeled with a colored reagent. One common point of the methods set forth in the three previous documents is a small field of observation.

The inventors desired to propose a simple and less costly alternative for the counting of particles of interest in a sample, by taking advantage of the large field of observation made possible by lensless imaging. As applied to blood samples, the invention may offer an alternative to the hematology machines currently available for the counting of cells in blood. The invention is particularly adapted to samples having elevated concentrations of particles, possibly reaching several hundreds of thousands of particles per microliter.

PRESENTATION OF THE INVENTION

One object of the invention is a method for counting particles, especially blood cells, arranged in a sample, comprising in particular the following steps:
  a) illumination of the sample with the aid of a light source, the light source emitting an incident light wave propagating toward the sample;
  b) acquisition, with the aid of an image sensor, of an image of the sample, formed in a detection plane, the sample being arranged between the light source and the image sensor, each image being representative of a light wave, known as the exposition wave, to which the image sensor is exposed under the effect of said illumination.

The method may also involve the following steps:
  c) application of a propagation operator based on the image acquired during step b), so as to calculate a complex expression of the exposition wave, along a reconstruction surface extending opposite the detection plane;
  d) formation of an image, known as the reconstructed image, representative of a distribution of the modulus and/or of the phase of the complex expression along the reconstruction surface;
  e) segmentation of the image formed during step d) to obtain a segmentation image, containing regions of interest spaced apart from each other, all or some of the regions of interest being associated with at least one particle of interest;
  f) determination of a size of regions of interest, and classification of said regions of interest as a function of their size according to at least one of the following classes:
    a class such that the region of interest contains a single particle of interest;
    a class such that the region of interest contains a predetermined number, greater than 1, of particles of interest;
  g) counting of the particles of interest which underwent a classification during step f).

The classification enables a more precise quantification of the particles of interest as compared to a simple counting of the selected regions of interest.

Step f) may involve, prior to the classification:
a determination of at least one morphological criterion for each region of interest;
a selection of the regions of interest (ROI) as a function of the morphological criterion, the classification being done for the selected regions of interest.

A morphological criterion may be chosen, in particular, from among a diameter, a size, or a form factor of each region of interest. Several morphological criteria can be combined.

Step f) may involve taking into account a reference size and/or a reference form representative of a predetermined number of particles of interest; the classification is then done as a function of said reference size.

Step f) may involve the following sub-steps:
fi) a first classification of the regions of interest, performed as a function of a first reference size, the first reference size corresponding to a predetermined number of particles of interest;
fii) after the first classification, a determination of a second reference size, based on the regions of interest classified, during sub-step fi), as containing a predefined number of particles of interest;
fiii) a second classification of the regions of interest, performed as a function of the second reference size ($S_{ref-2}$) determined during sub-step fii).

Step f) may involve, prior to the classification:
a calculation of a signal to noise ratio for several regions of interest;
a selection of the regions of interest as a function of the signal to noise ratio calculated for each of them, for example based on a comparison with respect to a threshold;
the classification being then done for the selected regions of interest.

The sample may be mixed with a sphering reagent prior to step b), in order to modify the shape of the particles of interest so as to make it spherical.

Step c) may involve the following sub-steps:
ci) definition of an initial image of the sample in the detection plane, based on the image acquired by the image sensor;
cii) determination of a complex image of the sample in a reconstruction surface by applying a propagation operator to the initial image of the sample defined during sub-step ci) or to the image of the sample, in the detection plane, resulting from the preceding iteration;
ciii) calculation of a noise indicator based on the complex image determined during sub-step cii), this noise indicator depending on a reconstruction noise affecting said complex image;
civ) updating of the image of the sample in the detection plane by an adjustment of phase values of the pixels of said image, the adjustment being done as a function of a variation of the indicator calculated during sub-step ciii) according to said phase values;
cv) reiteration of sub-steps cii) to civ) until achieving a criterion of convergence, so as to obtain a complex image of the sample in the detection plane and in the reconstruction surface.

Preferably, no image-forming optic or magnification optic is placed between the sample and the image sensor.

The particles of interest may be blood cells. According to one embodiment, during step d):
the particles of interest are red blood cells or white blood cells, the reconstructed image being representative of a distribution of the modulus of the complex expression along the reconstruction surface;
the particles of interest are platelets, the reconstructed image being representative of a distribution of a phase of the complex expression along the reconstruction surface.

The method may comprise the characteristics mentioned in the appended claims.

Another object of the invention is a device for the counting of particles of interest arranged in a sample, the device comprising:
a light source able to emit an incident light wave propagating toward the sample;
a support designed to hold the sample between the light source and an image sensor;
a processor designed to receive an image of the sample acquired by the image sensor and to carry out steps c) to g) of the method as described in this application.

Other advantages and characteristics will emerge more clearly from the following description of particular embodiments of the invention, given as nonlimiting examples, and represented in the figures listed below.

FIGURES

FIG. 1A represents a device example enabling the implementing of the invention. FIG. 1B represents another device example enabling the implementing of the invention.

FIG. 2A is a flow chart showing the principal steps of a method according to the invention. FIG. 2B shows a reconstructed image, known as an amplitude image, the sample containing red blood cells. FIG. 2C shows the image of FIG. 2B after segmentation, this figure showing several regions of interest distributed in the image. FIG. 2D shows the image of FIG. 2C after classification of each region of interest. FIG. 2E represents a histogram of the signal to noise ratio as determined for each region of interest.

FIG. 4A illustrates the principal steps of a method making possible the obtaining of a complex image of the sample, known as a reconstructed image, in a reconstruction plane. FIG. 4B diagrams the steps described in connection with FIG. 4A.

Figure 6A:
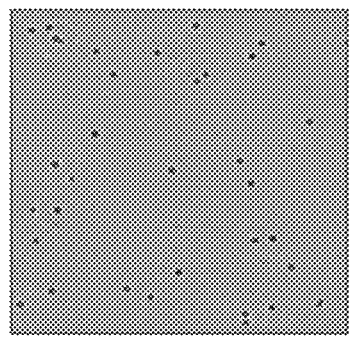
Figure 6B:
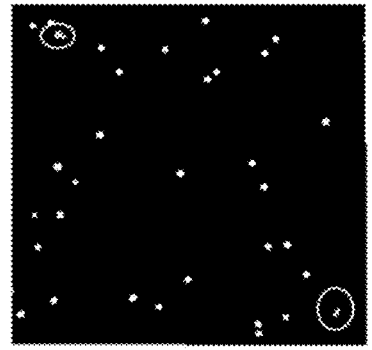
Figure 6C:
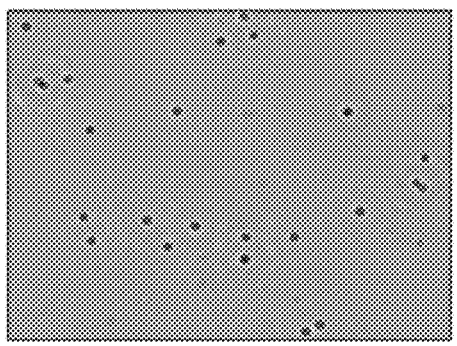
Figure 6D:
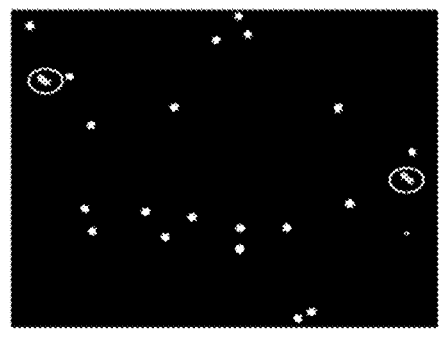

FIG. 6A shows a so-called reconstructed amplitude image, the sample containing white blood cells. FIG. 6B shows the image of FIG. 6A after segmentation. FIG. 6C shows a so-called reconstructed amplitude image, the sample containing white blood cells. FIG. 6D shows the image of FIG. 6C after segmentation.

Figure 7A:
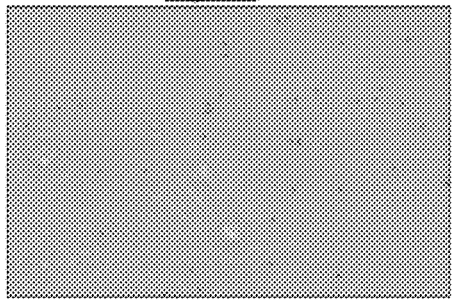
Figure 7B:
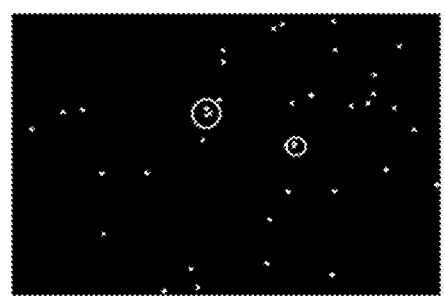

FIG. 7A shows a so-called reconstructed amplitude image, the sample containing glass beads. FIG. 7B shows the image of FIG. 7A after segmentation.

Figure 8A:
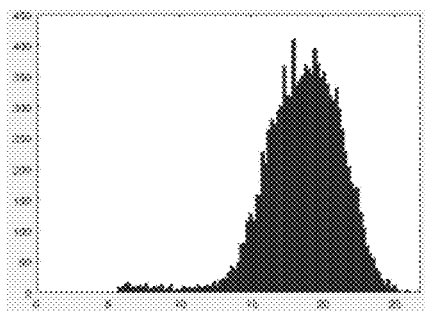
Figure 8B:
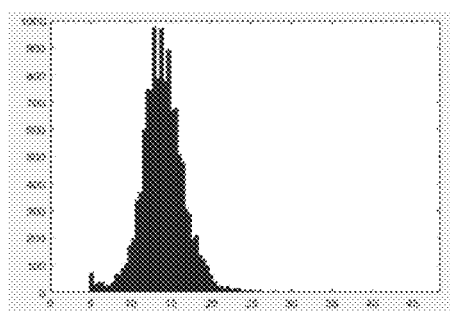

FIGS. 8A and 8B are histograms representing a distribution of signal to noise ratios of regions of interest corresponding to red blood cells.

PRESENTATION OF PARTICULAR EMBODIMENTS

Figure 1A:
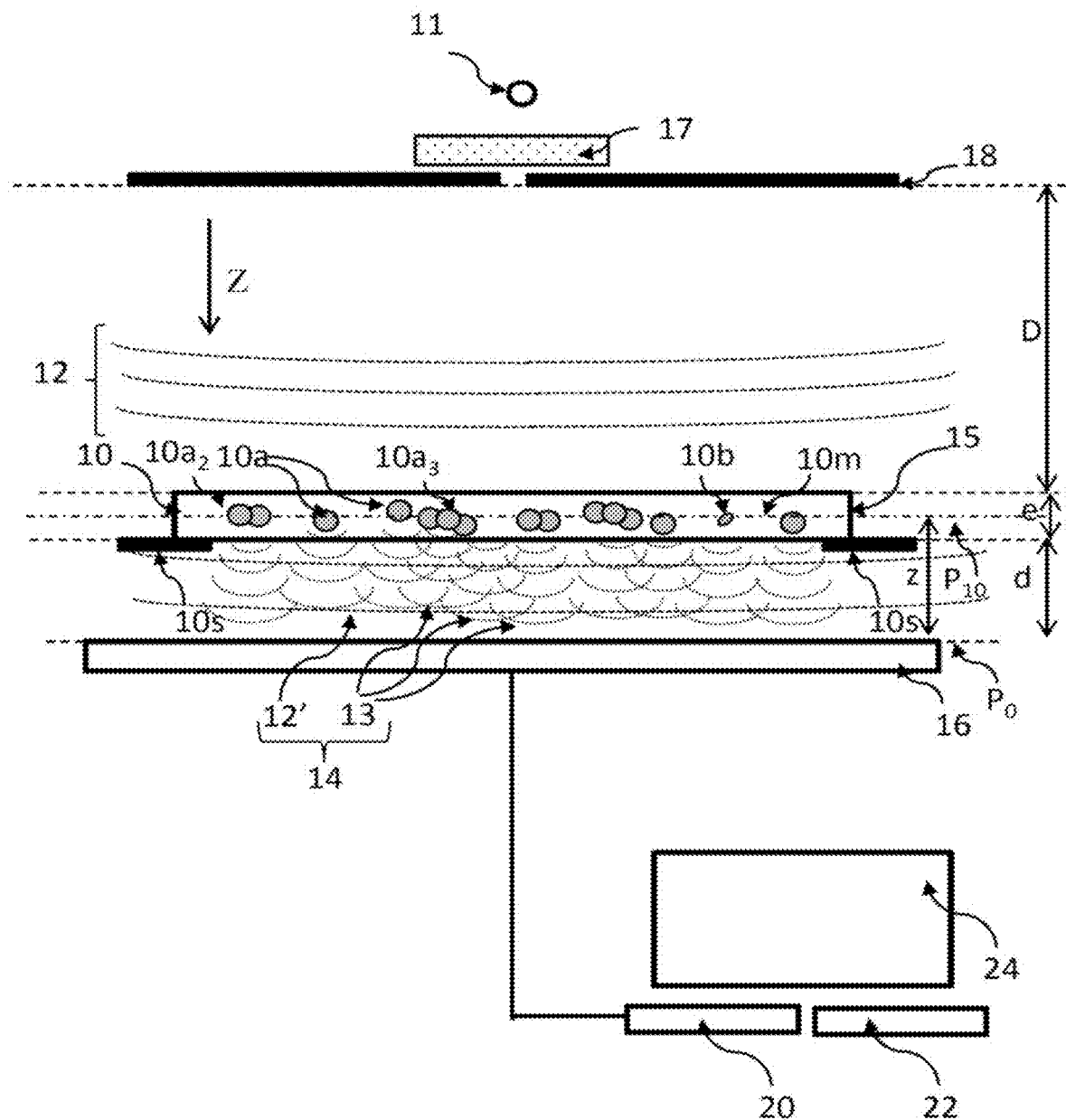

FIG. 1A shows an example of the device according to the invention. A light source 11 is able to emit a light wave 12, known as the incident light wave, propagating toward a sample 10, along an axis of propagation Z. The light wave is emitted in a spectral band $\Delta\lambda$.

The sample 10 is a sample containing particles, among which are particles of interest 10a which one wishes to count. By particles is meant cells, for example, and in particular blood cells, but they may also be microorganisms, viruses, spores, or microbeads, usually employed in biological applications, or even microalgae. They may also be droplets which are insoluble in a liquid medium 10m, such as oil droplets dispersed in an aqueous phase. Preferably, the particles 10a have a diameter, or are inscribed in a diameter, less than 100 µm, and preferably less than 50 µm or 20 µm. Preferably, the particles have a diameter, or are inscribed in a diameter, greater than 500 nm or 1 µm.

In the example represented in FIG. 1A, the sample comprises a medium 10m in which the particles of interest 10a are bathed. The particles 10a in this example are blood cells, for example red blood cells (erythrocytes) or white blood cells (leucocytes). The medium 10m in which the particles are bathed may be in particular a liquid, such as blood plasma, possibly diluted.

The sample 10 in this example is contained in a fluidic chamber 15. The fluidic chamber 15 is for example a fluidic chamber of Countess® type with a thickness e=100 µm. The thickness e of the sample 10, along the axis of propagation Z, typically varies between 10 µm and 1 cm, and is preferably between 20 µm and 500 µm. The sample 10 extends along a plane $P_{10}$, known as the plane of the sample, preferably perpendicular to the axis of propagation Z. It is maintained on a support 10s at a distance from an image sensor 16.

The distance D between the light source 11 and the sample 10 is preferably greater than 1 cm. This is preferably between 2 and 30 cm. Advantageously, the light source, as seen by the sample, is considered to be pointlike. This means that its diameter (or its diagonal) is preferably less than one tenth, or better one hundredth, of the distance between the sample and the light source. The light source 11 may be a light-emitting diode as shown in FIG. 1A. It may be associated with a diaphragm 18, or spatial filter. The aperture of the diaphragm is typically between 5 µm and 1 mm, preferably between 50 µm and 500 µm. In this example, the diaphragm is supplied by Thorlabs under reference P150S and its diameter is 150 µm. The diaphragm may be replaced by an optical fiber, whose first end is placed opposite the light source 11 and whose second end is placed facing the sample 10.

The device may comprise a diffuser 17, arranged between the light source 11 and the diaphragm 18. The use of such a diffuser makes it possible to overcome constraints of centering of the light source 11 with respect to the aperture of the diaphragm 18. The function of such a diffuser is to distribute the light beam produced by the light source along a cone with angle α. Preferably, the angle of diffusion α varies between 10° and 80°. The presence of such a diffuser helps make the device more tolerant of off-centering of the light source with respect to the diaphragm, and homogenizes the illumination of the sample. The diaphragm is not necessary, especially when the light source is sufficiently pointlike, particularly in the case of a laser source.

Figure 1B:
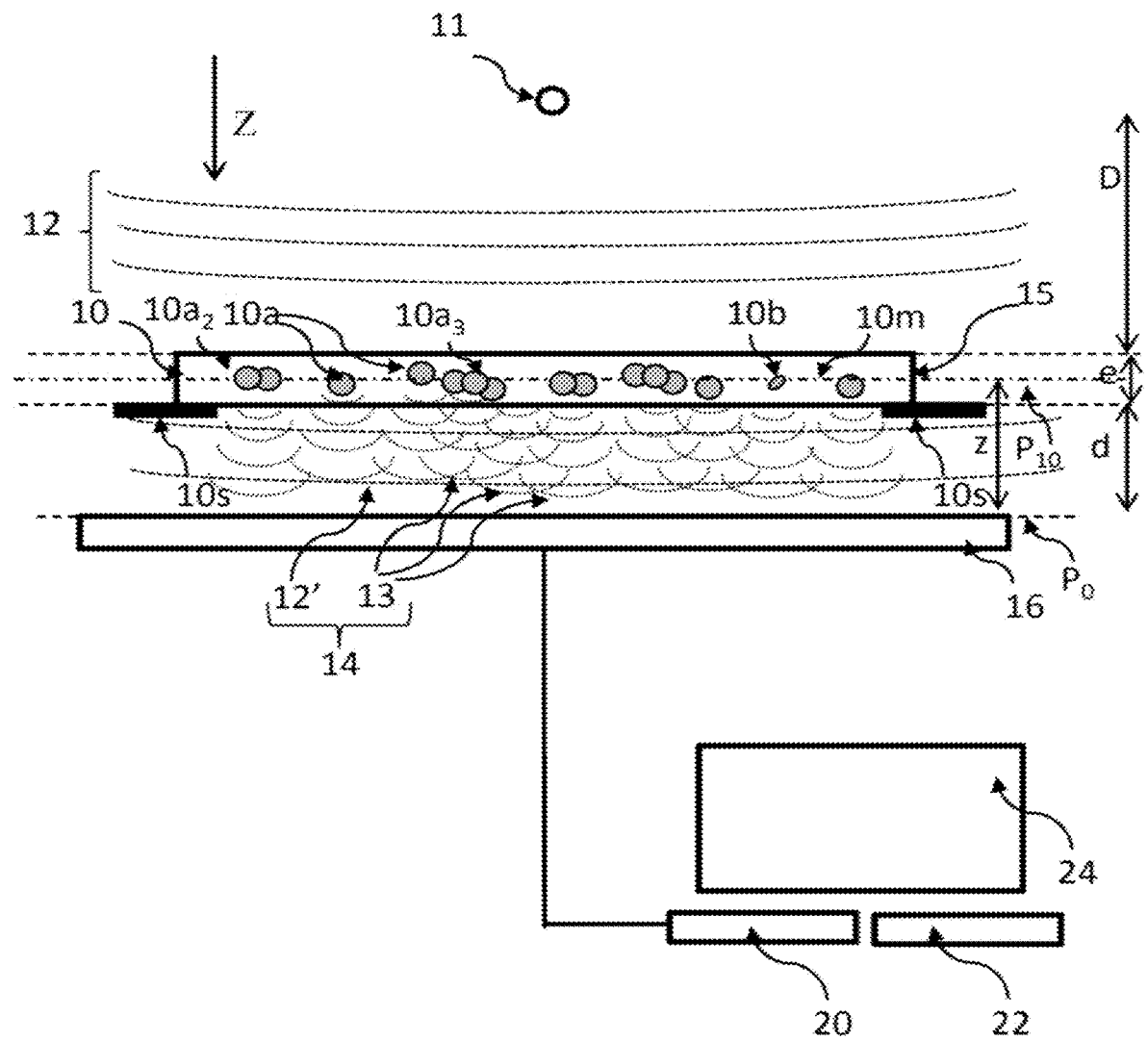

The light source 11 may be a laser source, such as a laser diode. In this case, it is not useful to associate it with a spatial filter 18 or a diffuser 17. Such a configuration is shown in FIG. 1B.

Preferably, the spectral emission band $\Delta\lambda$ of the incident light wave 12 has a width less than 100 nm. By spectral band width is meant a width at mid-height of said spectral band.

The sample 10 is arranged between the light source 11 and the previously mentioned image sensor 16. The latter extends preferably in parallel or substantially in parallel with the plane $P_{10}$ of extension of the sample. The term substantially parallel means that the two elements might not be strictly parallel, an angular tolerance of a few degrees, less than 20° or 10°, being allowed. The image sensor 16 is able to form an image $I_0$ along a detection plane $P_0$. In the example shown, it is an image sensor comprising an array of pixels, of CCD type, or a CMOS. The detection plane $P_0$ preferably extends perpendicular to the axis of propagation Z of the incident light wave 12. The distance d between the sample 10 and the array of pixels of the image sensor 16 is advantageously between 50 µm and 2 cm, preferably between 100 µm and 2 mm.

One will note the absence of any image-forming optic, such as a magnification optic, between the image sensor 16 and the sample 10. This does not preclude the possible presence of focusing micro-lenses in the area of each pixel of the image sensor 16, the latter not having the function of magnification of the image acquired by the image sensor.

Under the effect of the incident light wave 12, the particles present in the sample may create a diffracted wave 13, able to produce interference in the area of the detection plane $P_0$ with a portion 12' of the incident light wave 12 transmitted by the sample. Moreover, the sample may absorb a portion of the incident light wave 12. Thus, the light wave 14, known as the exposition wave, which is transmitted by the sample 10 and to which the image sensor 16 is exposed, may comprise:

a component 13 resulting from the diffraction of the incident light wave 12 by each particle of the sample;
a component 12' resulting from the transmission of the incident light wave 12 by the sample.

These components produce interference in the detection plane. Thus, the image $I_0$ acquired by the image sensor 16 comprises interference patterns (or diffraction patterns), each interference pattern being generated by a particle 10a of the sample 10.

A processor 20, such as a microprocessor, is designed to process each image $I_0$ acquired by the image sensor 16. In particular, the processor is a microprocessor connected to a programmable memory 22 in which a sequence of instructions is memorized for carrying out the image processing and calculation operations described in this description. The processor may be coupled to a screen 24 enabling the display of images acquired by the image sensor 16 or calculated by the processor 20.

As mentioned in connection with the prior art, an image $I_0$ acquired at the image sensor 16, also known as a hologram, does not allow one to obtain a sufficiently precise representation of the sample observed. One may apply, to each image acquired by the image sensor, a propagation operator h, in order to calculate a quantity representative of the exposition wave 14. Such a procedure, known as holographic reconstruction, in particular allows the reconstructing of an image of the modulus or of the phase of this light wave 14 in a reconstruction plane parallel to the detection plane $P_0$, and in particular in the plane $P_{10}$ of extension of the sample. For this, one makes a convolution product of the image $I_0$ acquired by the image sensor 16 with a propagation operator h. It is then possible to calculate a complex expression A of the light wave 14 at every point of spatial coordinates (x,y,z), and in particular along a reconstruction surface extending opposite the image sensor. The reconstruction surface may be in particular a reconstruction plane $P_z$ situated at a distance |z| from the image sensor 16, and in particular the plane $P_{10}$ of the sample, with:

A(x, y, z)=$I_0$(x, y, z)*h, * denoting the operator produced from the convolution.

In the rest of this description, the coordinates (x, y) denote a radial position in a plane perpendicular to the axis of propagation Z. The coordinate z denotes a coordinate along the axis of propagation Z.

The complex expression A is a complex quantity whose argument and modulus are respectively representative of the phase and the intensity of the light wave 14 to which the image sensor 16 is exposed. The convolution product of the image $I_0$ with the propagation operator h makes it possible to obtain a complex image $A_z$ representing a spatial distribution of the complex expression A in the reconstruction plane $P_z$, extending to a coordinate z of the detection plane $P_0$. In this example, the detection plane $P_0$ has for its equation z=0. The complex image $A_z$ corresponds to a complex image of the sample in the reconstruction plane $P_z$. It likewise represents a two-dimensional spatial distribution of the optical properties of the exposition wave 14. The propagation operator h has the function of describing the propagation of the light between the image sensor 16 and a point of coordinates (x, y, z), situated at a distance |z| from the image sensor. It is thus possible to determine the modulus M(x,y,z) and/or the phase φ(x, y, z) of the exposition wave 14, at this distance |z|, known as the distance of reconstruction, with:

$$M(x,y,z)=\text{abs}[A(x,y,z)] \quad (1);$$

$$\varphi(x,y,z)=\arg[A(x,y,z)] \quad (2).$$

The operators abs and arg denote respectively the modulus and the argument.

In other words, the complex expression A of the exposition wave 14 at every point of the spatial coordinates (x, y, z) is such that: $A(x, y, z)=M(x, y, z)e^{j\varphi(x, y, z)}$ (3). It is possible to form images $M_z$ and $\varphi_z$ representing respectively a distribution of the modulus or of the phase of the complex expression A in a surface extending opposite the detection plane $P_0$. Such a surface may be in particular a plane $P^z$ situated at a distance |z| from the detection plane $P_0$, with $M_z$=abs($A_z$) and $\varphi_z$=arg($A_z$). The previously mentioned surface is not necessarily planar, but it may extend substantially parallel to the detection plane and is preferably a plane $P^z$ parallel to the detection plane. In the rest of the description, the image obtained from the modulus and/or the phase of the complex image $A_z$ is called the "reconstructed image" and denoted by $I_z$.

The inventors have developed a method for counting particles 10a present in the sample by a procedure described in connection with FIGS. 2A to 2E. The principal steps of this procedure are described below.

Step 100: illumination of the sample. During this step, the sample is illuminated by the light source 11.

Step 110: acquisition of an image $I_0$ of the sample 10 by the image sensor 16, this image forming a hologram. One interesting feature of the lensless configuration, as represented in FIG. 1A or 1B, is the broad field observed, allowing the simultaneous addressing of an elevated volume of sample. The field observed depends on the size of the sensor, being slightly less than the surface of detection of the latter, due to the spacing between the sensor and the sample. The field observed is generally greater than 10 mm², or even 20 mm².

Step 120: calculation of a complex image $A_z$ in a reconstruction plane $P_z$. The complex image carries information about the phase and amplitude of the exposition wave 14 to which the image sensor 16 is exposed. The reconstruction plane is the plane $P_{10}$ of extension of the sample. Step 120 may be carried out by applying the propagation operator h, previously described, to an image resulting from the acquired image $I_0$. However, the application of the propagation operator to the acquired image may result in a complex image $A_z$ containing substantial reconstruction noise, often known as a twin image. In order to obtain a usable complex image, limiting the reconstruction noise, iterative algorithms may be implemented. One of these algorithms is described below, in connection with FIGS. 4A and 4B.

From the complex image $A_z$, one may obtain a reconstructed image $I_z$ based on the modulus $M_z$ and/or the phase $\varphi_z$ of the exposition wave 14, in the reconstruction plane $P_z$. The reconstruction distance with respect to the image sensor 16 is determined either a priori, knowing the position of the sample 10 with respect to the image sensor 16, or on the basis of a digital focusing algorithm, whereby the optimal reconstruction distance is the one for which the reconstructed image $I_z$ is the most distinct. Digital focusing algorithms are known to the person skilled in the art.

FIG. 2B is an example of a portion of a reconstructed image $I_z$ based on the modulus $M_z$ of a complex image $A_z$ obtained by a method implementing the steps described in connection with FIGS. 4A and 4B. In this figure, the contrast has been reversed. The particles of interest 10a which one wishes to count are red blood cells. They appear in the form of regions of interest ROI distributed in the reconstructed image and isolated from each other. The sample and the experimental conditions are described more precisely below, in connection with the experimental trials.

Step 130: segmentation. The image formed during step 120 is subjected to a segmentation, in order to isolate the regions of interest ROI corresponding to particles. By image segmentation is meant a partitioning of the image so as to regroup the pixels, for example as a function of their intensity. The image segmentation results in a segmentation image $I_z$* in which the regions of interest ROI, spaced apart from each other, are delimited, each region of interest possibly corresponding to a particle, or to a cluster of particles, as described below. Different methods of segmentation are known to the person skilled in the art. For example, one may apply an Otsu thresholding, consisting in determining a value of an intensity threshold from the histogram of the image, the threshold allowing an optimal separation of the pixels according to two classes: one class of pixels representing the regions of interest and one class of pixels representing the background of the image. FIG. 2C shows the result of a segmentation of the image of FIG. 2B by applying a thresholding according to the Otsu algorithm. The obtained image is binarized, the pixels representing the background of the image being dark (minimum gray level) while the pixels representing each zone of interest ROI are light (maximum gray level).

In this example, the segmentation image $I_z$* obtained in this step results from a segmentation of the image $M_z$ of the modulus of the complex amplitude $A_z$ of the exposition wave 14. As a variant, the image obtained in this step results from a segmentation of the image $\varphi_z$ of the phase of the exposition wave. The segmentation image $I_z^*$ may likewise combine the regions of interest appearing after the respective segmentations of the image $M_z$ of the modulus as well as the image $\varphi_z$ of the phase of the exposition wave.

A counting of the particles of interest by a simple counting of the regions of interest appearing in the segmentation image $I_z^*$ may provide a first order of magnitude as to the quantity of particles of interest. But the inventors have discovered that such a counting would yield rather imprecise results. In fact, certain regions of interest correspond to particles different from the particles that one wishes to count. Moreover, certain regions of interest bring together several particles of interest, which form clusters. This is due to the fact that certain particles of interest are close to each other, and are merged into the same region of interest. In FIGS. 1A and 1B, we have drawn clusters $10a_2$ containing two particles and clusters $10a_3$ containing three particles. These causes of error are handled in the steps described below.

Step 140: selection. During this step, a selection is done for the regions of interest that were determined during the previous step as a function of their morphology, that is, as a function of a morphological criterion, which might be the area, the shape, or the size. This makes it possible to select the regions of interest corresponding to the particles of interest that one wishes to count.

This step may involve a filtering of each region of interest as a function of the previously mentioned morphological criterion, in order to select regions of interest representative of the particles of interest. For example, when the particles of interest are red blood cells, the filtering makes it possible to select the regions of interest having a diameter less than 100 μm, or inscribed in such a diameter. This allows not considering large dust motes or traces, while preserving clusters of red blood cells.

In order to take account of effects of agglutination between particles of interest, a classification of the selected regions of interest may be done as a function of their area and/or their shape, especially based on a reference size $S_{ref}$, such as a reference area, the latter being for example representative of a region of interest corresponding to a single particle of interest (singlet). The reference area may be predetermined or obtained from the segmentation image $I_z^*$, for example by calculating a mean, or a median, of the area of each region of interest ROI, and assuming that the majority of the regions of interest correspond to a single particle. The size of each region of interest is then compared to the reference size $S_{ref}$, as a function of which each region of interest is assigned a number of particles. By size is meant a diameter or an area or another characteristic dimension. For example, in connection with FIG. 2D:
- if the size of a region of interest is between 0.5 and 1.5 times the reference size $S_{ref}$, it will be considered that the region of interest represents a single particle of interest, which corresponds to a singlet, such a region of interest being denoted as $ROI_1$. In FIG. 2D, the singlets are represented by white points.
- if the size of a region of interest is between 1.5 and 2.5 times the reference size $S_{ref}$, it will be considered that the region of interest represents two particles of interest; in FIG. 2D, such a region of interest $ROI_2$, corresponding to a doublet, is symbolized by a white oval contour.
- if the size of a region of interest is between 2.5 and 3.5 times the reference size $S_{ref}$, it will be considered that the region of interest represents three particles; in FIG. 2D, such a region of interest $ROI_3$ is symbolized by a white frame.

The notation $ROI_n$ corresponds to a region of interest which is considered, after the classification step, to comprise n particle(s), n being an integer which is strictly positive.

In an alternative or supplementary manner, prior to the classification, a selection may be done as a function of the form of each region of interest. For example, one determines for each region of interest a largest diameter and a smallest diameter. The ratio between the largest diameter and the smallest diameter makes it possible to quantify a form factor of the considered region of interest. By this selection, one may identify the regions of interest whose shape cannot be considered to be spherical, these regions of interest not being considered as being representative of particles of interest and not being taken into account in the counting. Thus, the selection may involve a comparison between the shape of each region of interest and a shape representative of the particle of interest, or cluster of particles of interest, being detected.

Figure 3A:
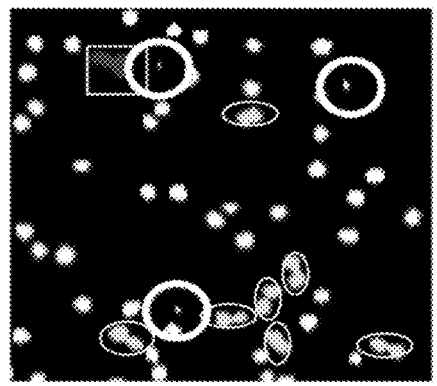
FIGS. 3A and 3B represent regions of interest respectively before and after a thresholding as a function of a value of the signal to noise ratio.
Figure 3B:
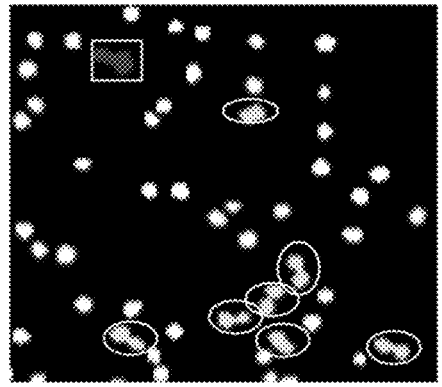
Figure 3C:
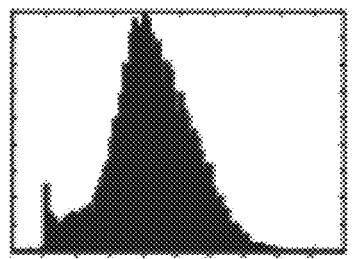
FIGS. 3C and 3D are histograms of the signal to noise ratios of images 3A and 3B, respectively.
Figure 3D:
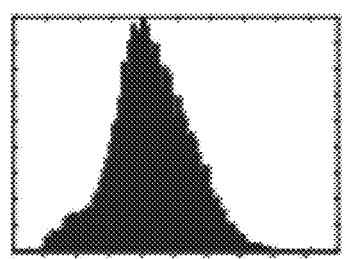

For each region of interest present in the segmentation image $I_z^*$, a signal to noise ratio S/B can be established. Such a signal to noise ratio may be calculated by producing a ratio between a mean value of pixels, known as central pixels, situated at the center of the region of interest, for example 9 central pixels, and the standard deviation calculated for a background of the image, the background of the image corresponding to the reconstructed image without the regions of interest. FIG. 2E is a histogram of the values of the S/B ratios calculated for the different regions of interest identified in the sample illustrated in FIGS. 2C and 2D. The majority of the regions of interest have an S/B greater than 4, which means a reliable detection and a good degree of confidence in the selection of the regions of interest, foretelling a reliable count. Step 140 may likewise involve a filtering of regions of interest as a function of their signal to noise ratio S/B. In fact, below a certain threshold, it will be considered that the signal to noise ratio is too low to effectively consider that a region of interest corresponds to one particle. FIGS. 3A and 3B show an example of a filtering of regions of interest based on a threshold value of the signal to noise ratio equal to 1.5. As can be seen in the histograms of the signal to noise ratios of the regions of interest represented in FIGS. 3A and 3B, said histograms being respectively the subject matter of FIGS. 3C and 3D, the thresholding makes it possible to eliminate the regions of interest with a low signal to noise ratio, the latter being surrounded by a thick circle in FIG. 3A. The regions of interest with a low S/B ratio do not appear in FIG. 3B. In this example, the filtering of regions of interest based on the S/B ratio has been limited to the singlets. In FIGS. 3A and 3B, as in FIG. 2D, the doublets are surrounded by an oval contour and the triplets are surrounded by a square contour.

Figure 3E:
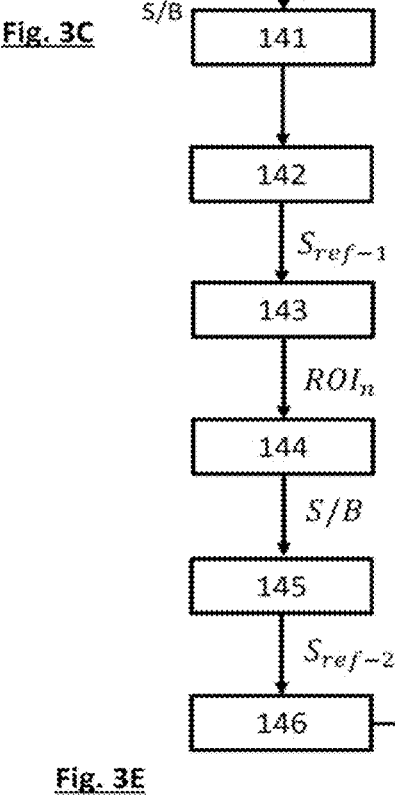
FIG. 3E shows the principal steps of a particular embodiment.
Figure 5A:
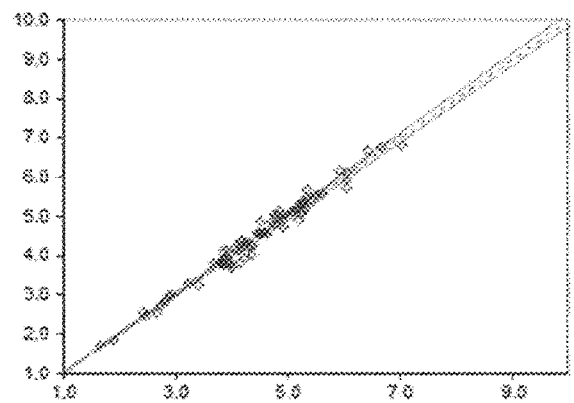
FIGS. 5A, 5B and 5C are curves representing the counting of red blood cells by implementing the invention and using a light-emitting diode emitting respectively in the blue, green and red spectral bands, as a function of counts performed with the aid of a reference method.
Figure 5B:
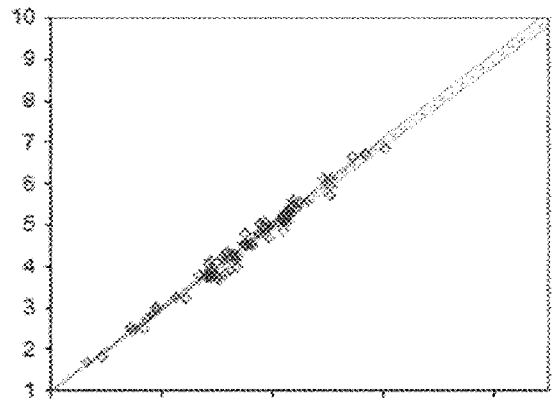
Figure 5C:
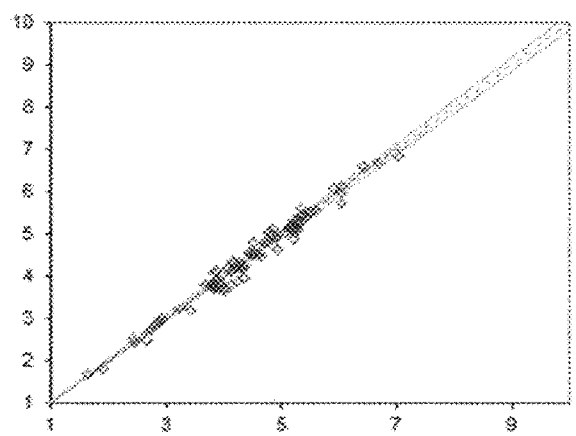
Figure 5D:
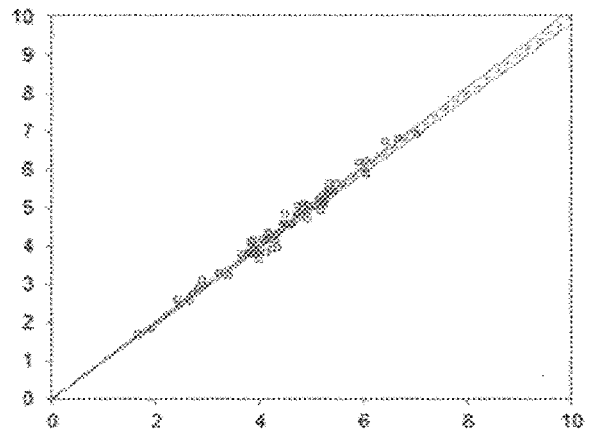
FIG. 5D is a curve representing the counting of red blood cells by implementing the invention and using a laser light source, as a function of counts performed with the aid of a reference method.

According to one embodiment, step 140 may involve the succession of the following operations, described in connection with FIG. 3E
- step 141: filtering of each region of interest ROI according to a diameter range representative of the particles of interest, such as 3 μm-12 μm in the case of red blood cells, and according to a shape criterion.
- step 142: calculation of a mean size of the regions of interest resulting from this filtering, this mean size constituting a first reference size $S_{ref-1}$;

step 143: classification of each region of interest ROI of the segmentation image, based on the first reference size $S_{ref-1}$, so as to assign a whole number n of particles to each region of interest $ROI_n$, step 144: calculation of a signal to noise ratio S/B of each region of interest $ROI_1$ considered as being a singlet;

step 145: calculation of a mean size of the singlets $ROI_1$ having a sufficient signal to noise ratio, that is, one greater than a threshold, the threshold possibly being equal to 1.5, this mean size constituting a second reference size $S_{ref-2}$;

step 146: classification of each region of interest ROI of the segmentation image, based on the second reference size $S_{ref-2}$ resulting from step 145;

step 147: assigning, to each region of interest ROI, a number of particles n determined during the classification.

This algorithm allows a progressive adjustment of the reference size used as the basis for the classification of the regions of interest. This allows one to obtain a more precise classification.

Thus, step 140 makes it possible to select the regions of interest which are representative of the particles of interest, and/or to assign a number of particle(s) to each region of interest considered as being representative of particles of interest.

Step 150: counting. During this step, one counts the regions of interest selected during step 140, that is, those considered as being representative of particles, taking into account a number of particles possibly assigned to each of them.

Step 120 described above may be realized by producing a convolution between a propagation operator and the image acquired by the image sensor. However, the application of such an operator may give rise to significant reconstruction noise. In order to optimize the reconstruction by limiting the reconstruction noise, step 120 may be carried out by an algorithm such as is described in the patent application FR1652500 filed 23 Mar. 2016. We shall now describe, in connection with FIGS. 4A and 4B, the principal steps of this algorithm. It involves an iterative algorithm, steps 121 to 125 described below being repeated, k designating the rank of an iteration. This method is designed to determine the phase of the exposition wave 14 in the detection plane $P_0$, so as to obtain progressively an estimation of the complex amplitude $A_0=A_{z=0}$ in the detection plane. During each iteration k, the complex image in the detection plane obtained during a previous iteration, denoted as $A_0^{k-1}$, is propagated in the reconstruction plane $P_z$ to form a complex image $A_z^k$ in the reconstruction plane $P_z$. Each iteration consists in adjusting the phase $\varphi_0^k$ of the complex image $A_0^k$ in the detection plane $P_0$ as a function of a noise criterion $\varepsilon^k$ determined from the complex image $A_z^k$.

Step 121: propagation of the detection plane toward the reconstruction plane

During this step, the image formed in the detection plane $P_0$ is available. During the first iteration, an initial image $A_0^{k=0}$ is determined from the image $I_0$ acquired by the image sensor. The modulus $M_0^{k=0}$ of the initial image $A_0^{k=0}$ may be obtained by applying the square root operator to the image $I_0$ acquired by the image sensor, in which case $M_0^{k=0}=\sqrt{I_0}$. An arbitrary value, such as 0, is assigned to the phase $\varphi_0^{k=0}$ of the initial image. During the following iterations, the image in the detection plane is the complex image $A_0^{k-0}$ resulting from the previous iteration. The image formed in the detection plane $P_0$ is propagated in the reconstruction plane $P_z$, by the application of a propagation operator h as previously described, so as to obtain a complex image $A_z^k$, representative of the sample 10, in the reconstruction plane $P_z$. The propagation is realized by convolution of the image $A_0^{k=0}$ with the propagation operator $h_{-z}$, such that:

$$A_z^k = A_0^{k-0} * h_{-z},$$

The index −z represents the fact that the propagation is realized in a direction opposite to the axis of propagation Z. One speaks of retropropagation.

Step 122: Calculation of an indicator in several pixels

During this step, one calculates a quantity $\varepsilon^k(x, y)$ associated with each pixel of a plurality of pixels (x, y) of the complex image $A_z^k$, and preferably in each of its pixels. This quantity depends on the value $A_z^k(x, y)$ of the image $A_z^k$, or its modulus, at the pixel (x, y) for which it is calculated. It may likewise depend on a dimensional derivative of the image in this pixel, for example the modulus of a dimensional derivative of this image. In this example, the quantity $\varepsilon^k(x, y)$ associated with each pixel is a modulus of a difference of the image $A_z^k$, in each pixel, and the value 1. Such a quantity may be obtained by the expression:

$$\varepsilon^k(x,y) = \sqrt{(A_z^k(x,y)-1)(A_z^k(x,y)-1)^*} = |A_z^k(x,y)-1|$$

Step 123: establishing of a noise indicator associated with the image $A_z^k$.

During step 122, one calculates quantities $\varepsilon^k(x, y)$ in several pixels of the complex image $A_z^k$. These quantities may form a vector $E^k$, whose terms are the quantities $\varepsilon^k(x, y)$ associated with each pixel (x, y). In step 123, one calculates an indicator, known as a noise indicator, from a norm of the vector $E^k$. The quantity $\varepsilon^k(x, y)$ calculated from the complex image $A_z^k$, at each pixel (x, y) of the latter, is summed in order to constitute a noise indicator $\varepsilon^k$ associated with the complex image $A_{ref}^k$.

Thus, $\varepsilon^k = \Sigma_{(x, y)} \varepsilon^k(x, y)$

An important aspect of this step is to determine, in the detection plane $P_0$, phase values $\varphi_0^k(x, y)$ of each pixel of the image $A_0^k$ in the plane of the sample, making it possible to obtain, during a following iteration, a reconstructed image $A_z^{k+1}$ whose noise indicator $\varepsilon^{k+1}$ is less than the noise indicator $\varepsilon^k$.

During the first iteration, the only information available pertains to the intensity of the exposition wave 14, but not to its phase. The first reconstructed image $A_z^{k=1}$ in the reconstruction plane $P_z$ is thus assigned a substantial reconstruction noise, due to the absence of information as to the phase of the light wave 14 in the detection plane $P_0$. Consequently, the indicator $\varepsilon^{k=1}$ is elevated. During subsequent iterations, the algorithm carries out a progressive adjustment of the phase $\varphi_0^k(x, y)$ in the detection plane $P_0$, so as to progressively minimize the indicator $\varepsilon^k$.

The image $A_k^0$ in the detection plane is representative of the light wave 14 in the detection plane $P_0$, both from the standpoint of its intensity and its phase. Steps 120 to 125 are designed to establish, in iterative fashion, the value of the phase $\varphi_0^k(x, y)$ of each pixel of the image $A_z^k$, minimizing the indicator $\varepsilon^k$, the latter having been obtained for the image $A_z^k$ obtained by propagation of the image $A_0^{k-1}$ in the reconstruction plane $P_z$.

The minimization algorithm may be a gradient descent algorithm or a conjugated gradient descent algorithm, the latter being described below.

Step 124: Adjustment of the value of the phase in the detection plane.

Step 124 is designed to determine a value of the phase $\varphi_0^k(x, y)$ of each pixel of the complex image $A_0^k$ so as to minimize the indicator $\varepsilon^{k+1}$ resulting from a propagation of the complex image $A_0^k$ in the reconstruction plane $P^z$, during the following iteration k+1. For this, a phase vector $\varphi_0^k$ is established, each term of which is the phase $\varphi_0^k(x, y)$ of a pixel (x, y) of the complex image $A_0^k$. The dimension of this vector is ($N_{pix}$, 1), where $N_{pix}$ denotes the number of pixels considered. This vector is updated during each iteration, by the following updating expression:

$$\varphi_0^k(x,y)=\varphi_0^{k-1}(x,y)+\alpha^k p^k(x,y) \text{ where:}$$

$\alpha^k$ is an integer, denoted as the "step", and representing a distance;

$p^k$ is a direction vector, of dimension ($N_{pix}$, 1), each term p(x, y) of which forms a direction of the gradient $\nabla \varepsilon^k$ of the indicator $\varepsilon^k$.

This equation may be expressed in vectorial form as follows:

$$\varphi_0^k=\varphi_0^{k-1}+\alpha^k p^k$$

It can be shown that:

$$p^k=-\nabla \varepsilon^k+\beta^k p^{k-1}$$

where:

$\nabla \varepsilon^k$ is a gradient vector, of dimension ($N_{pix}$, 1), each term of which represents a variation of the indicator $\varepsilon^k$ as a function of each of the degrees of freedom of the unknowns of the problem, that is, the terms of the vector $\varphi_0^k$;

$p^{k-1}$ is a direction vector established during the previous iteration;

$\beta^k$ is a scale factor applied to the direction vector $p^{k-1}$.

Each term $\nabla \varepsilon^k(x, y)$ of the gradient vector $\nabla \varepsilon$ is such that $$\nabla \varepsilon^k(r') = \frac{\partial \varepsilon^k}{\partial \varphi_0^k(r')} = \operatorname{Im}(A_0^{k*})(r') \cdot \left( \frac{(A_{ref}^k - 1)}{|A_{ref}^k - 1|} * h_z \right)(r')$$

where Im represents the imaginary operator and r' represents a coordinate (x, y) in the detection plane.

The scale factor $\beta^k$ may be expressed such that:

$$\beta^{(k)} = \frac{\nabla \varepsilon^{(k)} \cdot \nabla \varepsilon^{(k)}}{\nabla \varepsilon^{(k-1)} \cdot \nabla \varepsilon^{(k-1)}}$$

The step $\alpha^k$ may vary according to the iterations, for example, between 0.03 during the first iterations and 0.0005 during the last iterations.

The updating equation makes it possible to obtain an adjustment of the vector $\varphi_0^k$, resulting in an iterative updating of the phase $\varphi_0^k(x, y)$ in each pixel of the complex image $A_0^k$. (This complex image $A_0^k$, in the detection plane, is then updated by these new phase values associated with each pixel.

Step 125: Reiteration or exiting from the algorithm.

If no criterion of convergence has been achieved, step 125 consists in reiterating the algorithm, by a new iteration of steps 121 to 125 based on the complex image $A_0^k$ updated during step 124. The criterion of convergence may be a predetermined number K of iterations, or a minimum value of the gradient $\nabla \varepsilon^k$ of the indicator, or a difference considered to be negligible between two consecutive phase vectors $\varphi_0^{k-1}$, $\varphi_0^k$. When the criterion of convergence is achieved, one will have an estimation considered to be correct of a complex image of the sample in the detection plane $P_0$.

Step 126: Obtaining of the complex image in the reconstruction plane.

At the end of the last iteration, the method involves a propagation of the complex image $A_0^k$ resulting from the last iteration in the reconstruction plane $P^z$, so as to obtain a complex image in the reconstruction plane $A_z=A_z^k$.

Experimental Trials

During the course of a first series of trials, the method previously described was used with diluted blood samples in order to count the red blood cells. FIGS. 5A to 5D present the results obtained by the method as a function of values produced by an automatic hematology machine ABX Pentra 120 DX. The experimental conditions are the following:

sample 10: diluted blood contained in a Countess® fluidic chamber of thickness 100 µm, the volume examined being as much as 3 mm³, or 3 µl.

light source 11: light-emitting diode Cree MC-E Color, comprising three light-emitting diodes emitting respectively in the following spectral bands Δλ: 450 nm-465 nm; 520 nm-535 nm; 630 nm-640 nm. In this example, a single diode is activated during each illumination. Alternatively, a laser diode emitting on a wavelength of 405 nm was used, according to the embodiment shown in FIG. 1B.

image sensor: CMOS IDS µEye monochrome sensor, 3840×2748 pixels, each pixel measuring 1.67 µm on a side, the surface of detection extending for around 30 mm²;

distance D between the light source 11 and the sample 10: 8 cm when the light source 11 is the light-emitting diode and 15 cm when the light source is the laser diode distanced between the sample 10 and the image sensor 16: 1500 µm;

thickness e of the fluidic chamber 15: 100 µm;

diameter of the aperture of the spatial filter 18 when the light source 11 is a light-emitting diode: 150 µm;

In this first series of trials, human blood was diluted in a sphering reagent, enabling a modification of the surface tension of the red blood cells so as to render them spherical. A preliminary calibration was done, with the aid of a reference machine, in order to produce, in a way familiar to the person skilled in the art, a recalibration between the concentration of the blood and the number of red blood cells counted. This recalibration takes into account the dilution factor, the thickness of the chamber, and the surface of the sample exposed to the image sensor.

The protocol for preparation of the sample was as follows:
dilution to 1/600 in a sphering reagent;
taking a sample of 10 µl of diluted blood and injection into the fluidic chamber arranged opposite the image sensor;

Each sample was the subject of a counting by an ABX Pentra DX 120 machine, used as the reference method.

80 samples were measured. FIGS. 5A, 5B, 5C and 5D respectively show the results obtained by implementing the invention (ordinate axes) as a function of the reference measurements (abscissa axes), the light source being:
the light-emitting diode emitting in the spectral band 450 nm-465 nm;
the light-emitting diode emitting in the spectral band 520 nm-535 nm;
the light-emitting diode emitting in the spectral band 630 nm-640 nm;
the laser diode.

A linear regression was established for each of these figures, the expression for each regression being respectively:

$y=1.017x-0.04(r^2=0.98)$;

$y=1.019x-0.07(r^2=0.98)$;

$y=1.017x-0.07(r^2=0.98)$;

$y=1.027x-0.11(r^2=0.98)$.

The coefficient $r^2$ is the coefficient of determination associated with each linear regression of Passing-Bablok type.

During a second series of trials, we counted the white blood cells in samples of human blood, after lysis of the red blood cells by adding a lysis reagent. The image segmentation was done on the basis of a thresholding based on a maximum entropy criterion. In order to take account of the density of the white blood cells, the dilution factor used was equal to 10. FIG. 6A represents an image of the modulus of the complex image in the reconstruction plane $P_z$, the latter being a plane of extension of the sample. FIG. 6B represents the image of FIG. 6A after segmentation, binarization and detection of clusters composed of two white blood cells. These are surrounded by a white ring. The identification of the singlets and doublets enables a more precise quantification of the white blood cells, as compared to a simple counting of the regions of interest. FIGS. 6C and 6D correspond respectively to FIGS. 6A and 6B with a different sample. The acquisition was done using a light source of laser type, as previously described.

The method was likewise tested during the course of a third series of trials, using glass beads of diameter 5 μm. These were reference beads of Bangs laboratories—SS06N, diluted to 1/2000 in a saline buffer of PBS type. The acquisition was done using a light source of laser type, as previously described. One observes the detection of a cluster containing two beads. FIG. 7A represents an image of the modulus of the complex image in the reconstruction plane $P_z$, the latter being a plane of extension of the sample. FIG. 7B represents the image of FIG. 7A after segmentation, binarization and detection of clusters containing two beads, these clusters being surrounded by a white contour.

In the case of red blood cells, the inventors believe it to be preferable for the surface density of particles of interest being counted to be less than 2000 particles per mm² of surface of detection. Beyond this, the particles are too close together, which degrades the signal to noise ratio of each region of interest. Thus, it is advantageous to estimate, for the different cases in question, a maximum surface density and to then adapt the dilution being applied to the sample.

One of the intended applications is the counting of blood cells, which may be red blood cells, white blood cells, or platelets. The inventors have discovered that in the case of white blood cells or red blood cells, during step 120, it is preferable for the reconstructed image $I_z$ to represent the modulus of the complex amplitude $A_z$ in the reconstruction plane $P_z$. The definition of the edges of the regions of interest, corresponding to the cells, is more distinct. When the particles of interest are platelets, on the other hand, it seems preferable for the reconstructed image $I_z$ to represent the phase of the complex amplitude $A_z$ in the reconstruction plane $P_z$. FIGS. 8A and 8B represent a histogram of the signal to noise ratio of regions of interest corresponding to red blood cells, based respectively on the modulus or the phase of the reconstructed complex image. The number of red blood cells considered was respectively equal to 12166 and 12888. One observes a higher signal to noise ratio when based on an image of the modulus (mean of 18.6) than when based on a phase image (mean of 13.9). In these trials, the red blood cells were illuminated in a blue spectral band.

The inventors carried out experimental trials. After these trials, they defined the variants set forth below, each variant being able to be combined in whole or in part with the previously described steps.

According to a first variant, one carries out the steps 100, 110 and 120 as previously described. During the course of step 120, the reconstruction distance taken into account corresponds to a focusing distance determined by carrying out a digital focusing algorithm, as previously described. Step 120 also involves a determination of a criterion of validity of the digital focusing. For this, the image acquired during step 110 is virtually partitioned into p zones, p being an integer which is strictly positive. Typically, p is between 1 and 100, such as 9. A digital focusing algorithm is applied in each zone so as to obtain, for each zone, a focusing distance $d_p$. One then determines a dispersion indicator $\delta(d_p)$ of the focusing distances.

If the dispersion indicator $\delta(d_p)$ exceeds a predetermined maximum dispersion indicator $\delta_{max}$, the digital focusing is invalidated. In this case, the focusing distance is considered to be equal to a mean focusing distance $d_{mean}$ established on the basis of a number k of previously analyzed samples, for which the focusing distance $d_k$ was memorized. For example, the mean focusing distance $d_{mean}$ may be calculated by a moving average, considering the last k samples analyzed, k being an integer, for example between 2 and 100. $d_{mean}$ may also be a median of the respective focusing distances $d_k$ of the last k samples analyzed.

If the dispersion indicator $\delta(d_p)$ is less than the maximum dispersion indicator $\delta_{max}$, the focusing distance is considered to be the mean $\overline{d_p}$ (or the median) of the focusing distances $d_p$ obtained respectively for each zone.

The dispersion indicator $\delta(d_p)$ may be a difference between a minimum focusing distance $d_{p-min}$ and a maximum focusing distance $d_{p-max}$: $\delta(d_p)=d_{p-max}-d_{p-min}$ It may also comprise a standard deviation or a variance of the focusing distances $d_p$.

Furthermore, in each zone partitioning the acquired image, the digital focusing algorithm is established by considering a lower focusing limit $d_{inf}$ and an upper focusing limit $d_{sup}$. After the application of the digital focusing algorithm to each zone, if for at least one zone the focusing distance determined is less than or equal to the limit $d_{inf}$, or greater than or equal to the limit $d_{sup}$, the focusing distance is considered as being equal to the mean (or median) focusing distance $d_{mean}$ described above. In fact, if the focusing algorithm provides at least one focusing distance $d_p$ less than or equal to $d_{inf}$ or greater than or equal to $d_{sup}$, it is probable that the focusing distance is in error. Thus, the focusing distance is replaced by the distance $d_{mean}$, the latter being considered to be more probable.

According to a second variant, in the course of step 130 the segmentation is done by an Otsu thresholding. The value of the segmentation threshold so obtained is compared to the mode of the histogram of the reconstructed image $I_z$, whether a phase image or an image of the modulus, or a combination of these, of the reconstructed image. The mode of the histogram corresponds to a level of intensity of pixels corresponding to the maximum of the histogram of the reconstructed image. If the segmentation threshold determined by the Otsu thresholding is greater than 90% of the mode of the histogram, the segmentation threshold applied is arbitrarily set at a certain percentage of the mode of the histogram, for example, between 80% and 85% of the mode of the histogram. In fact, when the Otsu threshold is close to the mode of the histogram, the segmentation of the reconstructed image is generally not satisfactory, since zones of noise are considered as being one or more regions of interest. In these conditions, the fact of imposing a segmentation threshold between 80% and 85% of the mode of the histogram makes it possible to avoid this pitfall.

According to a third variant, one determines a criterion of quality Q of the image $I_z^*$ segmented during step 130. When the criterion of quality indicates a poor quality of the segmented image, the method is interrupted.

The criterion of quality Q may correspond to an overall area of the regions of interest resulting from the segmentation performed during the course of step 130. Thus, one carries out steps 100, 110, 120 and 130 as previously described. During the course of step 130, one determines the total area A of the regions of interest determined by the segmentation, the latter being for example carried out by the application of Otsu thresholding. Then, if the total area A surpasses a predefined maximum area $A_{max}$, the image acquired during step 110 is invalidated;

if the total area A is less than the maximum area $A_{max}$ but is situated close to the latter, one calculates an auxiliary criterion Q', based on a signal to noise ratio $SNR(I_z^*)$ of the segmented image $I_z^*$. By close to the maximum area $A_{max}$ is meant between the maximum area and a percentage of the maximum area $A_{max}$, such as 80% or 90% of the maximum area.

The maximum area $A_{max}$ may be determined by the person skilled in the art on the basis of experimental trials. The signal to noise ratio $SNR(I_z^*)$ of the segmented image $I_z^*$ corresponds to a level of intensity $I_{ROI}$ in the different regions of interest ROI segmented during step 130, normalized by an estimation of the noise $N_{out}$ outside of the regions of interest. The level of intensity $I_{ROI}$ may be estimated by a mean value μ or a median value med of the intensity in the different regions of interest ROI. The noise $N_{out}$ outside the regions of interest may be estimated by the standard deviation σ in the segmented image $I_z^*$, outside the regions of interest ROI. Thus:

$$SNR(I_z^*) = \frac{I_{ROI}}{N_{out}}$$

The signal to noise ratio so defined is then compared to a predetermined signal to noise ratio threshold $SNR_{min}$. If the signal to noise ratio $SNR(I_z^*)$ is greater than this threshold, the segmented image is considered to be valid. Otherwise, the segmented image is invalidated.

According to such an embodiment, after step 130 one determines at least one criterion of quality Q with respect to the segmented image $I_z^*$. The criterion of quality may correspond to a comparison between an area A of all of the regions of interest segmented during the course of step 130 and a predefined maximum area $A_{max}$. As a function of the comparison, the segmented image will be validated or invalidated. If the area A of all of the segmented regions of interest is less than the maximum area $A_{max}$, close to the latter, an auxiliary criterion of quality Q' will be determined. It may involve a comparison between the signal to noise ratio $SNR(I_z^*)$ of the segmented image, as previously defined, and a minimum signal to noise ratio $SNR_{min}$. As a function of this comparison, the segmented image will be validated or invalidated.

This variant was applied to 305 samples, the particles being red blood cells. It was able to invalidate images corresponding to particular cases such as empty images, images in which the number of particles is too low or too high, or images resulting from a problem occurring during the acquisition.

A fourth variant, described below, may relate more particularly to samples containing blood. During the course of experimental trials, the inventors considered that, as a general rule, when the particles of interest are red blood cells, it is advisable to provide, in step 140, a distinction between N types of regions of interest $ROI_n$ with $1 \leq n \leq N$. N is an integer generally between 3 and 5. It will be recalled that, as described in connection with step 140, the notation $ROI_n$ corresponds to a region of interest ROI containing n particles. The integer N corresponds to the maximum number of acceptable red blood cells in the same region of interest. When N=5, one distinguishes 5 types of regions of interest, corresponding to singlets (n=1), doublets (n=2), triplets (n=3), quadruplets (n=4) and quintuplets (n=5). It is considered that the regions of interest whose size exceeds an upper threshold $S_{max}$, do not correspond to a cluster of red blood cells. Thus, step 140 involves taking into account a maximum size $S_{max}$, and a rejection of a region of interest when its size is greater than the maximum size $S_{max}$ The maximum size $S_{max}$ is a size greater than the size corresponding to the region of interest $ROI_{n=N}$. The maximum size $S_{max}$ is parametrizable, and depends on the experimental conditions, for example, the fluidic chamber used. The regions of interest whose size surpasses the maximum size $S_{max}$ are rejected. It has been found that, when the analyzed sample contains blood lacking in agglutinins, the number of regions of interest so rejected is less than 10. The number of regions of interest rejected can be determined by comparing:

the number of regions of interest at the end of the segmentation step 130;

the number of regions of interest at the end of the selection step 140.

If the number of regions of interest rejected is less than or equal to a predefined level of acceptance $L_{max}$, for example being less than or equal to 10, the count of the particles of interest is validated. The level of acceptance $L_{max}$ may be adjusted, by the person skilled in the art, during the course of an experimental learning phase. If the number of regions of interest rejected surpasses the level of acceptance $L_{max}$, the count of the particles of interest is invalidated and this invalidation is reported. Such a situation may correspond, for example, to blood containing cold agglutinins. Owing to this, the blood contains many clusters of red blood cells, having a number of red blood cells greater than the maximum acceptable number of red blood cells N. In such a case, the inventors have observed that the number of regions of interest rejected might reach several tens, or even several hundreds. Given the number of regions of interest rejected, the count of the red blood cells is highly underestimated.

During the course of experimental trials on six samples containing blood including cold agglutinins, and considering N=5, the inventors measured a number of rejected regions of interest respectively equal to 325, 379, 490, 508, 327 and 423. Given the number of rejected regions of interest, surpassing the level of acceptance $L_{max}$, the count of the red blood cells was thus invalidated.

According to such an embodiment, after step 130 one determines the number of regions of interest resulting from the segmentation of the image. Step 140 then involves:

taking into account a maximum size $S_{max}$ of regions of interest, the regions of interest whose size exceeds the maximum size being rejected;

a determination of the number of regions of interest rejected;

taking into account a level of acceptance $L_{max}$ and a comparison between the number of regions of interest rejected and the level of acceptance, as a function of which the counting of the particles of interest is validated or invalidated.

The level of acceptance $L_{max}$ may be defined by the person skilled in the art during the course of experimental trials.

The invention may be used for the counting of particles of interest in the blood, but also in other bodily fluids, such as urine, saliva, sperm, etc. It may also be used in the quantification of microorganisms, such as bacteria or bacterial colonies. Beyond applications involving biology or healthcare, the invention may be used for inspection of samples in industrial fields or environmental monitoring, for example, in agriculture or the inspection of industrial fluids.

The invention claimed is:

1. A method for counting particles, known as particles of interest, arranged in a sample, the method comprising the following steps:
   a) illumination of the sample with the aid of a light source, the light source emitting an incident light wave propagating toward the sample;
   b) acquisition, with the aid of an image sensor, of an image ($I_0$) of the sample, formed in a detection plane ($P_0$), the sample being arranged between the light source and the image sensor, each image being representative of a light wave, known as the exposition wave, to which the image sensor is exposed under the effect of said illumination;
   c) based on the image acquired ($I_0$) during step b), application of a propagation operator (h) so as to calculate a complex expression ($A_z$) of the exposition wave, along a reconstruction surface ($P_z$) extending opposite the detection plane ($P_0$);
   d) formation of an image ($I_z$, $M_z$, $\varphi_z$), known as the reconstructed image, representative of a distribution of the modulus or of the phase of the complex expression along the reconstruction surface;
   e) segmentation of the image formed during step d) to obtain a segmentation image ($I_z^*$), containing regions of interest (ROI) spaced apart from each other, all or some of the regions of interest being associated with at least one particle of interest;
   f) determination of a size of regions of interest, and classification of said regions of interest as a function of their size according to at least one of the following classes:
      a class such that the region of interest contains a single particle of interest;
      a class such that the region of interest contains a whole number, greater than 1, of particles of interest; and
   g) counting of the particles of interest based on the regions of interest which underwent a classification during step f).

2. The method as claimed in claim 1, in which step f) comprises, prior to the classification:
   a determination of at least one morphological criterion for each region of interest;
   a selection of the regions of interest (ROI) as a function of the morphological criterion, the classification being done for the selected regions of interest.

3. The method as claimed in claim 2, wherein at least one morphological criterion is chosen from among a diameter, a size, or a form factor of each region of interest.

4. The method as claimed in claim 1, wherein step f) comprises taking into account a reference size ($S_{ref}$), representative of a predetermined number of particles of interest, the classification being done as a function of said reference size.

5. The method as claimed in claim 1, wherein step f) comprises the following sub-steps:
   fi) a first classification of the regions of interest, performed as a function of a first reference size ($S_{ref-1}$), the first reference size corresponding to a predetermined number of particles of interest;
   fii) after the first classification, a determination of a second reference size ($S_{ref-2}$), based on the regions of interest classified, during sub-step fi), as containing a predefined number of particles of interest; and
   fiii) a second classification of the regions of interest, performed as a function of the second reference size ($S_{ref-2}$) determined during sub-step fii).

6. The method as claimed in claim 1, wherein step f) comprises, prior to the classification:
   a calculation of a signal to noise ratio (S/B) for several regions of interest (ROI); and
   a selection of the regions of interest (ROI) as a function of the signal to noise ratio (S/B) calculated for each of them,
   the classification being done for the regions of interest so selected.

7. The method as claimed in claim 1, wherein the sample is mixed with a sphering reagent prior to step b), in order to modify the shape of the particles of interest so as to make it spherical.

8. The method as claimed in claim 1, wherein step c) comprises the following sub-steps:
   ci) definition of an initial image of the sample ($A_0^{k=0}$) in the detection plane, based on the image ($I_0$) acquired by the image sensor;
   cii) determination of a complex image of the sample ($A_z^k$) in a reconstruction surface ($P_z$) by applying a propagation operator to the initial image of the sample ($A_0^{k=1}$) defined during sub-step ci) or to the image of the sample ($A_0^{k-1}$), in the detection plane, resulting from the preceding iteration (k-1);
   ciii) calculation of a noise indicator ($\in^k$) based on the complex image ($A_z^k$) determined during sub-step cii), this noise indicator depending on a reconstruction noise affecting said complex image ($A_z^k$);
   civ) updating of the image of the sample ($A_0^k$) in the detection plane ($P_0$) by an adjustment of phase values ($\varphi_0^k(x,y)$) of the pixels of said image, the adjustment being done as a function of a variation of the indicator calculated during sub-step ciii) according to said phase values; and
   cv) reiteration of sub-steps cii) to civ) until achieving a criterion of convergence, so as to obtain a complex image of the sample in the detection plane ($P_0$) and in the reconstruction surface ($P_z$).

9. The method as claimed in claim 1, wherein no image-forming optic is placed between the sample and the image sensor.

10. The method as claimed in claim 1, wherein the particles of interest are blood cells.

11. The method as claimed in claim 10, wherein during step d):
   the particles of interest are red blood cells or white blood cells, the reconstructed image being representative of a distribution of the modulus of the complex expression ($A_z$) along the reconstruction surface ($P_z$); and the particles of interest are platelets, the reconstructed image being representative of a distribution of a phase of the complex expression ($A_z$) along the reconstruction surface ($P_z$).

12. The method as claimed in claim 1, wherein step c) comprises an application of a digital focusing algorithm so as to determine a focusing distance corresponding to the distance of reconstruction to which the reconstruction surface ($P_z$) extends.

13. The method as claimed in claim 12, wherein during step c) the image acquired during step b) is partitioned into different zones, distinct from each other, and in which the digital focusing algorithm is applied in each zone so as to obtain, for each of them, a focusing distance ($d_p$), step c) also comprising:
   taking into account a maximum dispersion indicator ($\delta_{max}$);
   calculation of a dispersion indicator ($\delta(d_p)$) representing a dispersion of the obtained focusing distances ($d_p$);
   a comparison between the calculated dispersion indicator ($\delta(d_p)$) and the maximum dispersion indicator ($\delta_{max}$);
   as a function of the comparison:
   calculation of a mean or a median ($\overline{d_p}$) of the focusing distances ($d_p$) obtained for each zone, the mean or the median then forming the focusing distance used during step c);
   or taking into account memorized focusing distances in order to establish the focusing distance ($d_{mean}$) used during step c).

14. The method as claimed in claim 13, wherein the dispersion indicator ($\delta(d_p)$) is a difference between a maximum focusing distance ($d_{p-max}$) and a minimum focusing distance ($d_{p-min}$), or a variance or a standard deviation of the obtained focusing distances ($d_p$).

15. The method as claimed in claim 12, wherein during step c) the image acquired during step b) is partitioned into different zones, distinct from each other, and in which the digital focusing algorithm is applied in each zone so as to obtain, for each of them, a focusing distance ($d_p$), step c) also comprising:
   taking into account a lower focusing limit ($d_{inf}$);
   taking into account an upper focusing limit ($d_{sup}$);
   a comparison of each focusing distance ($d_p$) with the lower focusing limit ($d_{inf}$) and with the upper focusing limit ($d_{sup}$);
   as a function of the comparison:
   if the focusing distance is between the lower focusing limit ($d_{inf}$) and the upper focusing limit ($d_{sup}$), calculation of a mean or a median ($\overline{d_p}$) of the focusing distances ($d_p$) obtained for each zone, the mean or the median then forming the focusing distance used during step c); and
   if the focusing distance ($d_p$) is less than or equal to the lower focusing limit ($d_{inf}$) or greater than or equal to the upper focusing limit ($d_{sup}$), taking into account memorized focusing distances in order to establish the focusing distance ($d_{mean}$) used during step c).

16. The method as claimed in claim 1, wherein step e) comprises:
   a determination of a mode of the histogram of the reconstructed image ($I_z$, $M_z$, $\varphi_z$), corresponding to an intensity of a maximum number of pixels of the reconstructed image;
   implementing an Otsu thresholding in order to obtain a segmentation threshold based on which the segmentation of the reconstructed image is done; and
   a comparison between the mode of the histogram and the segmentation threshold, such that when the segmentation threshold is greater than 90% of the mode of the histogram the segmentation threshold is set at a percentage between 80% and 85% of the mode of the histogram.

17. The method as claimed in claim 1, wherein step e) comprises a determination of a criterion of quality (Q) of the segmented image ($I_z^*$), comprising:
   taking into account a predetermined maximum area ($A_{max}$);
   a determination of the area (A) of all of the regions of interest (ROI) of the segmented image ($I_z^*$),
   a comparison of the area (A) of all of the regions of interest with the maximum area ($A_{max}$); and
   as a function of the comparison, rejection or validation of the segmented image ($I_z^*$).

18. The method as claimed in claim 17, wherein, if the segmented image ($I_z^*$) is validated, and the area (A) of the regions of interest is situated close to the maximum area ($A_{max}$), the method comprises a determination of an auxiliary criterion of quality (Q'), comprising:
   taking into account a predetermined minimum signal to noise ratio ($SNR_{min}$);
   calculation of a signal to noise ratio ($SNR(I_z^*)$) of the segmented image ($I_z^*$), in the form of a ratio between a mean or median intensity ($I_{ROI}$) in the regions of interest (ROI) and a noise level ($N_{out}$) of the segmented image outside the regions of interest;
   a comparison between the signal to noise ratio of the segmented image ($SNR(I_z^*)$) and the minimum signal to noise ratio ($SNR_{min}$); and
   as a function of the comparison, rejection or validation of the segmented image ($I_z^*$).

19. The method as claimed in claim 1, wherein during step f) the regions of interest whose size exceeds a maximum predetermined size ($S_{max}$) are rejected, the method comprising:
   a determination of the number of regions of interest rejected during step f);
   taking into account a predetermined level of acceptance ($L_{max}$); and
   a comparison between the number of regions of interest rejected during step f) and the level of acceptance ($L_{max}$) as a function of which the counting of the particles of interest, performed during step g), is validated or invalidated.

20. A device for the counting of particles of interest arranged in a sample, the device comprising:
   a light source to emit an incident light wave propagating toward the sample;
   a support designed to hold the sample between the light source and an image sensor; and
   a processor configured to receive an image of the sample acquired by the image sensor and to carry out steps c) to g) of the method as claimed in claim 1.

* * * * *

UNITED STATES PATENT AND TRADEMARK OFFICE
CERTIFICATE OF CORRECTION

| | | |
|---|---|---|
| PATENT NO. | : 11,199,488 B2 | Page 1 of 1 |
| APPLICATION NO. | : 16/471429 | |
| DATED | : December 14, 2021 | |
| INVENTOR(S) | : Blandin et al. | |

It is certified that error appears in the above-identified patent and that said Letters Patent is hereby corrected as shown below:

On the Title Page

Column 2, Item (56), under "FOREIGN PATENT DOCUMENTS", Line 3, delete "WO-2016151249" and insert -- WO 2016/151249 --, therefor.

In the Claims

In Column 22, Claim 18, Line 30, delete "(SNR($I_z^*$)" and insert -- (SNR($I_z^*$)) --, therefor.

Signed and Sealed this
Fourteenth Day of June, 2022

Katherine Kelly Vidal
*Director of the United States Patent and Trademark Office*